July 31, 1973   J. M. BATCHELDER ET AL   3,749,631
METHOD AND APPARATUS FOR PREPARING AND ASSEMBLING
COMMUNICATIONS FOR MASS DISTRIBUTION
Filed April 26, 1971   8 Sheets-Sheet 1

INVENTOR
JOHN M. BATCHELDER
AUGUSTUS W. GRISWOLD
BY
*Irving Seidman*
ATTORNEY

FIG. 4

INVENTOR.
JOHN M. BACHHELDER
AUGUSTUS W. GRISWOLD
BY
ATTORNEY

United States Patent Office 3,749,631
Patented July 31, 1973

3,749,631
METHOD AND APPARATUS FOR PREPARING AND ASSEMBLING COMMUNICATIONS FOR MASS DISTRIBUTION
John M. Batchelder, New Shrewsbury, N.J., and Augustus W. Griswold, Rochester, N.Y., assignors to Dapak Systems, Inc., New York, N.Y.
Filed Apr. 26, 1971, Ser. No. 137,502
Int. Cl. B32b 31/00
U.S. Cl. 156—350
13 Claims

ABSTRACT OF THE DISCLOSURE

This disclosure is directed to a method and apparatus for assembling informational material or data for mass distribution from continuous sheets of web material. This is attained by forming a laminate of compatible sheets from two or more continuous strips of web material to define the informational unit readied for mailing or distribution. The continuous strips depending on the article formed, are pattern printed with suitable adhesive and perforated in a predetermined manner to define compatible continuous sheets. The respective compatible sheets are then imprinted with the desired information or data, be it variable or uniform, prior to the lamination or bonding of the compatible sheets. After printing the respective sheets are subsequently collated and bonded together in accordance with the pressure sensitive pattern printed thereon. The continuous webs thus bonded are then severed or cut into individual informational units to be distributed in accordance with the perforated pattern.

An apparatus for effecting high speed collation and bonding of the compatible sheets of continuous webs comprises a machine having an input section and an output section. The respective sheets of continuous web material are simultaneously fed into the input section of the machine where the sheets are collated and conveyed at very high speeds to the output section by an endless conveyor. In the output section the collated sheets are passed between pressure rollers for bonding to form a continuous laminated structure of connected readily separable units.

A heater section is interposed between the input and output section to condition the adhesive pattern of the compatible sheets by heat to facilitate the bonding. The heater section includes a pair of complementary heater platens, hingedly connected to pivot between operative and inoperative positions. The arrangement is such that the heater platens will pivot to an inoperative position whenever the machine is stopped for any reason. Upon passage of the collated sheets through the pressure rollers the laminated sheets are cooled by passing over a cooling medium, and secondary bonding pressure is applied by passing the cooled laminated sheets through a second set of pressure rollers.

PROBLEM AND PRIOR ART

Heretofore many efforts have been made to facilitate and enhance the method and manner in which informational material and data, as for example, checks, invoices, bills, notices, promotional literature, accounts receivable or accounts payable, etc., are processed for mass distribution. Generally such efforts have developed about the continuous envelope assembly of the type disclosed in U.S. Pats. Nos. 3,337,120; 3,339,827; 3,437,259 and others. However, in each of the known methods there still remained a number of manual operations or other steps requiring the application and/or use of various independent types of office equipment or machines before the information or data could be mailed out. For example, the assembly described in Pat. No. 3,437,259 required the continuously formed envelopes to be formed with an open edge along a marginal portion thereof so as to facilitate the subsequent insertion thereinto of additional material before mailing.

In other known arrangements it is required that a transfer medium be incorporated on or within the continuously formed envelope so that the variable information could be transferred from the outerply of the packet to the appropriate insert. Such systems thus require the imprinting of the variable information to be communicated on the appropriate insert only after the completion of the packet, and prior to the mailing thereof.

It has thus been noted that the known systems required a number of distinct operations which were either manually and/or automatically performed. Where automatically performed such operations generally required a particular type of office equipment. For example in business forms requiring multiple copies produced by carbons or other transfer sheets, it was necessary to effect the removal of these transfer sheets prior to mailing. In many instances the steps of separating the informational sheets, signing, collating, folding and stuffing them into envelopes was separately and/or independently accomplished. As a result mass distribution of informational material such as checks, invoices, bills, etc., resulted in the expenditure of considerable time, effort and labor, frequently requiring several distinct and different types of machines to perform the respective functions necessary in preparing such informational material for distribution. The utilization of such auxiliary office machines further necessitated a considerable expenditure of capital investment for the particular users thereof.

Objects

An object of this invention resides in the provision of a method and apparatus to automate and accelerate the speed for the preparation of informational material for mass distribution.

Another object of this invention is to provide a method and apparatus which enhances the economy, flexibility, accuracy and speed for processing informational communications of various kinds of mass distribution.

Another object of this invention is to provide a method and apparatus in which the informational material is maintained in a continuous web form which can be rapidly handled until the final step immediately before distribution.

Another object of this invention is to provide a method and apparatus for handling mass communications involving a minimum of operational steps to reduce the cost and time otherwise required for distributing such informational material.

Another object of this invention is to provide a method and apparatus which is versatile in application, capable of forming informational material made up of several parts, all bonded into one secure outgoing document, as for example, a check or notice, bonded in a form which can be posed as a postcard or as a multiple part document for more complex uses, including inserts, notices, checks with enclosures, proxies and the like, with return envelopes which can be mailed and returned by mail.

Another object of this invention is to provide a method and apparatus in which the informational material is maintained more confidential during the preparation and distribution thereof.

Another object of this invention is to provide an apparatus for effecting the speedy collation and bonding of preprinted informational material on two or more compatible continuous sheets of web material.

Another object is to provide a method and apparatus which permits, for mass distribution, the original print of variable data.

Another object of this invention resides in the provision of an apparatus in which the continuous strips of prepared informational material are preheated to a predetermined temperature prior to bonding thereof.

Another object of this invention is to provide an improved collating and bonding apparatus utilizing a heater arranged to be moved to an inoperative position whenever the machine operation is interrupted for any reason.

BRIEF SUMMARY OF THE INVENTION

The method of preparing communications for mass distribution in accordance with this invention comprises the steps of utilizing two or more sheets of a continuous web material in which a coating of a pressure sensitive adhesive is applied to at least one of the continuous sheets of web material in a predetermined pattern. The respective sheets of web material are then perforated in a predetermined compatible pattern whereby the sheets after assembly can be readily separated into a plurality of individual mailing units. The respective sheets are then individually preprinted with the informational data which may be either uniform and/or variable. The respective continuous sheets thus coated, perforated and printed are then collated in contiguous superimposed relationship wherein the respective sheets are bonded into a laminated packet to define an integrally formed, multi-layer web. The laminated web thus formed is then severed along the predetermined lines of perforation to define the individual mailing units containing the informational material. To enhance the bonding operation the collated sheets may be subjected to a heated environment prior to the application of the bonding pressure. If desired, a secondary application of bonding pressure may be applied. When the collated sheets are subjected to a heated environment prior to bonding, the laminated web may be subjected to cooling prior to the application of the secondary bonding pressure.

The apparatus for effecting the collation and bonding of the two or more continuous sheets of web material prepared as described above comprises a frame having mounted thereon an input section and an output section disposed in spaced relationship. A heating section is interposed between the input and output sections. The input section is provided with means for infeeding the respective sheets of web material in a manner to effect collation thereof in contiguous superimposed relationship in a predetermined sequence. Means are provided for simultaneously advancing the superimposed collated sheets of web material at a relatively high rate of speed through the heater section of the apparatus in moving from the input section to the output section.

The heater section comprises a pair of overlying heater platens which are pivotally connected so as to pivot between an operative and inoperative position. The arrangement is such that the heater platens are moved to an inoperative position whenever the machine is stopped for any reason.

In the output section there is provided pressure rollers for imparting the bonding pressure to the collated sheets as the respective sheet material moves therebetween. Downstreamwise from the pressure applicating rollers is a cooling means for cooling the bonded sheets. If desired, a secondary pressure applicating means is provided to apply a final bonding pressure to the laminated material. The laminated web thus formed is subsequently cut or divided into the individual units along the preformed perforations to ready for mailing.

FEATURES

A feature of this invention resides in the provision of a high speed method and apparatus for processing informational data for mass distribution.

Another feature of this invention resides in the provision of an improved apparatus for effecting high speed collation and bonding of preformed compatible sheets of continuous web material having preprinted informational data thereon into a continuous laminated structure.

Another feature of this invention resides in the provision of an apparatus in which continuous sheets, preprinted with informational data are collated with other compatible strips of continuous web material in a manner wherein the respective sheets are assembled and bonded to form an integrally constructed laminated informational unit which is readied for mass distribution when separated into its individual units.

Other features and advantages will become more readily apparent in view of the specification and drawings in which.

DETAILED DESCRIPTION

Figures 1, 1A:
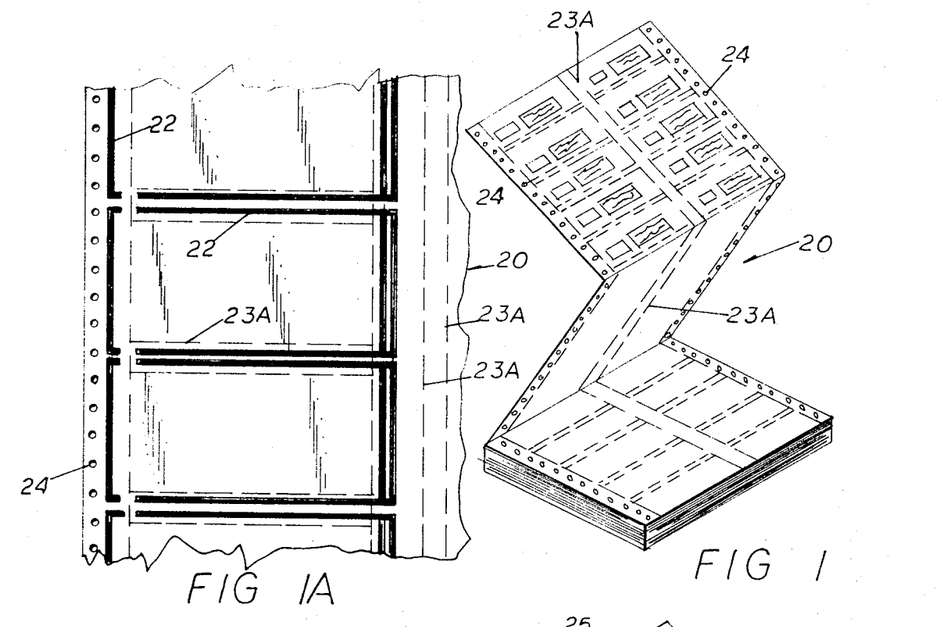
FIG. 1 illustrates a perspective view of a preformed sheet of web material comprising a portion of a laminated informational communication assembled in accordance with this invention.
FIG. 1A is a plan view of the back side of the web material of FIG. 1.
Figure 2:
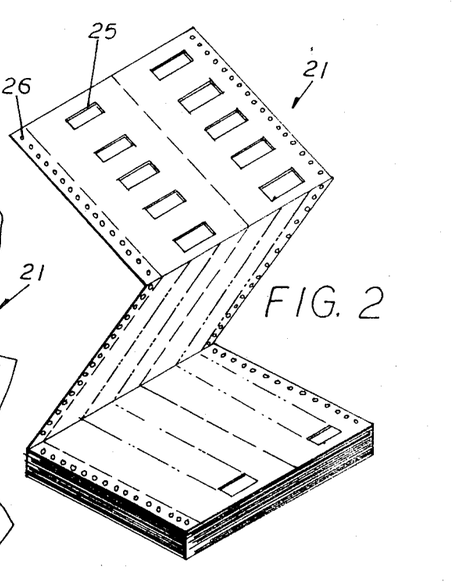
FIG. 2 is a perspective view of a compatible sheet of web material forming a portion of the informational until assembled in accordance with this invention.
Figure 2A:
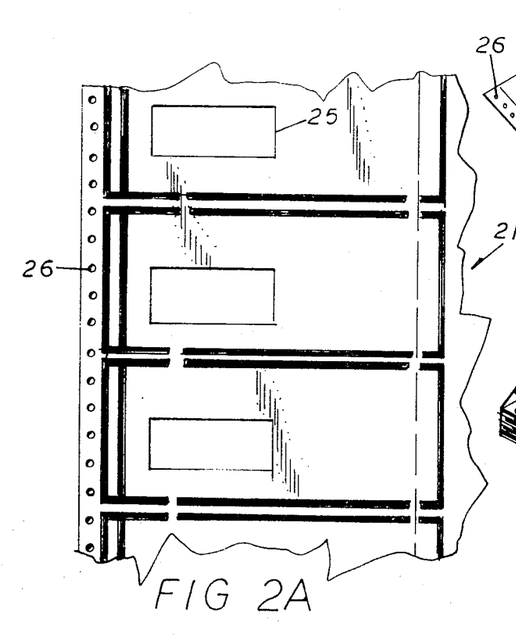
FIG. 2A is a plan view of the back side of the sheet of web material of FIG. 2.

Referring to the drawings there is shown in FIGS. 1 and 2 illustrative examples of a type of sheet of web material utilized for the assembling and making of the informational material for mass distribution in accordance with the invention to be herein described. The informational material prepared by this invention is made up of at least two or more sheets of continuous web material, e.g., sheets 20 and 21, which are each specifically constructed as compatible sheets which can be readily assembled into a continuous strip of connected informational data cards, packets or envelopes. The invention herein contemplates that the information is preprinted in original print, e.g. as received from a computer print-out machine, onto the respective sheets prior to assembly so that the resulting packet can be immediately readied for mailing after assembly.

In accordance with this invention the method of preparing such informational material or communication into a continuous strip of separable units for mass distribution in a continuous manner or operation comprises the steps of first applying a pressure sensitive adhesive material in a predetermined pattern 22 to at least one side of one of the continuous sheets of web material as shown in FIG. 1A. In the illustrated example, FIG. 1A, the pattern is defined by a series of longitudinally and transversely extending lines of adhesive. However, it will be understood that the adhesive pattern 22 applied to the web material may assume any desired pattern depending upon the ultimate construction and/or configuration of the end product.

The method herein described can be utilized to construct a postcard type mailing of information data formed of two compatible sheets of continuous web material, or the method can be equally applicable in forming communication packets in the form of a continuous series of connected envelopes having one or more inserts formed with or without a connected return envelope.

After the adhesive pattern 22 has been applied to the sheet material 20, it is perforated or scored to define easy tear lines 23A or otherwise delineated by guide lines, in accordance with a predetermined pattern to form the sheet 20 into a number of connected mailing unit part 23. The perforation step also includes the forming of a series of longitudinally extending apertures 24 adjacent the opposed marginal edge portions of the sheet 20. As will be hereinafter described, the marginal apertures 24 are utilized to define the means by which the web material can be rapidly conveyed through a collating and bonding machine. It will be understood that the pattern defined by the easy tear or separation line 23A may vary depending upon the size and shape of the individual unit 23. The perforation step may also include cut-out portions of the sheet material in the appropriate portions thereof to define window opening 25 through which an address, for example, printed on a subjacent compatible sheet would be visible.

The compatible sheet 21 may or may not include a pattern of pressure sensitive adhesive thereon, depending upon the structure of the communication to be formed. The compatible sheet 21 also is perforated to provide for the longitudinal extending marginal perforations 26 similar to that of the continuous web of FIG. 1. Also the compatible web 21 is perforated or scored transversely and longitudinally thereof in a manner compatible to that with the scoring of FIG. 1 to provide a series of easy tear lines which will permit ready separation of the individual units after final assembly thereof. The sheets 20, 21 thus formed have imprinted thereon suitable information or data. It will be understood that this information or data may be uniform, or it may be varied depending upon the subject matter to be disseminated, e.g., in notices of various kinds, invoices, bills, checks, proxy statements and various other business information.

In accordance with this invention the informational data is preprinted on the respective webs by passing the webs 20, 21 through a suitable printing machine, as for example, a computer print-out machine or printer. The respective sheets thus imprinted with the desired information, each in original print, are readied for collation where they are disposed in contiguous overlying position in a predetermined sequence. Upon the collation of the respective sheets 20, 21, they are laminated or bonded together by the application of a bonding force. After the respective compatible sheets have been assembled and bonded to form a continuous strip of readily separable units, individual units are separated, and if necessary sorted and counted for immediate mailing.

To enhance the bonding, the compatible sheets are subjected to a heated environment prior to the application of the bonding force thereon. A second or subsequent application of a bonding pressure is applied to the bonded strip subsequent to an intermediate cooling step.

Figure 3:
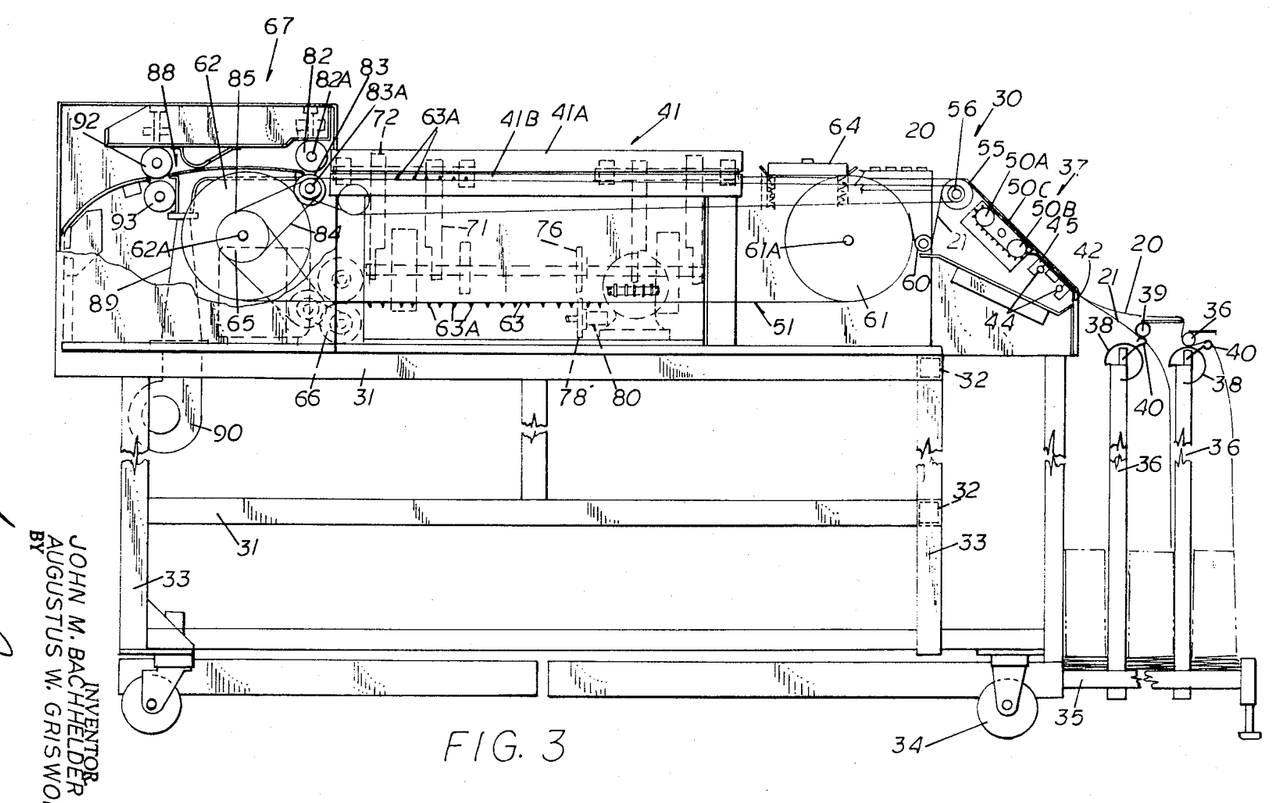
FIG. 3 is a side elevation view of the collating and bonding apparatus of this invention having portions thereof shown in section.

To expedite the collating, assembling and bonding of the compatible sheets 20, 21 of material constructed as hereinabove described, there is provided in accordance with this invention an improved high speed collating and bonding machine 30. The collating and bonding machine 30 comprises a compact frame consisting of structural members 31 and 32 extending longitudinally and transversely respectively between opposed pairs of leg members 33. Suitable side panels are connected to the structural members 31, 32 to house the frame. As seen in FIG. 3 the frame is suitably supported on wheels or casters 34 to facilitate the movement of the machine over a supporting surface.

A pair of opposed slides or rails 35—35 are slideably supported along the lower portion of the machine frame for movement between an extended and retracted position on one end of the frame. Connected to the respective slides or rails 35—35 adjacent the external end are one or more upwardly extending opposed stanchions 36—36 to define a paper feed assembly 37 for guiding or directing the respective compatible sheets 20, 21 of web material to the input section 37 of the machine. It will be understood that the number of stanchions 36 defining assemblies 37 connected on the respective slides 35 corresponds in number to the number of compatible sheets required for forming the multiple packet or informational material.

Figure 4:
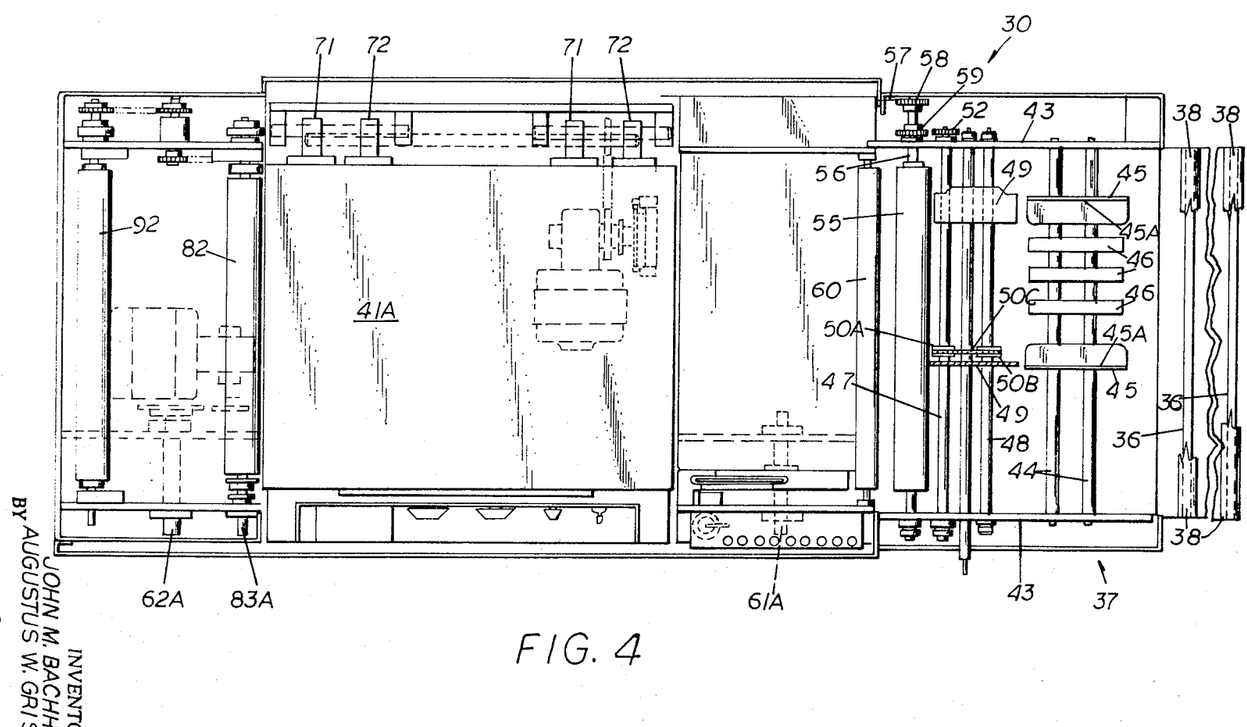
FIG. 4 is a top plan view of the apparatus of FIG. 3.
Figure 5:
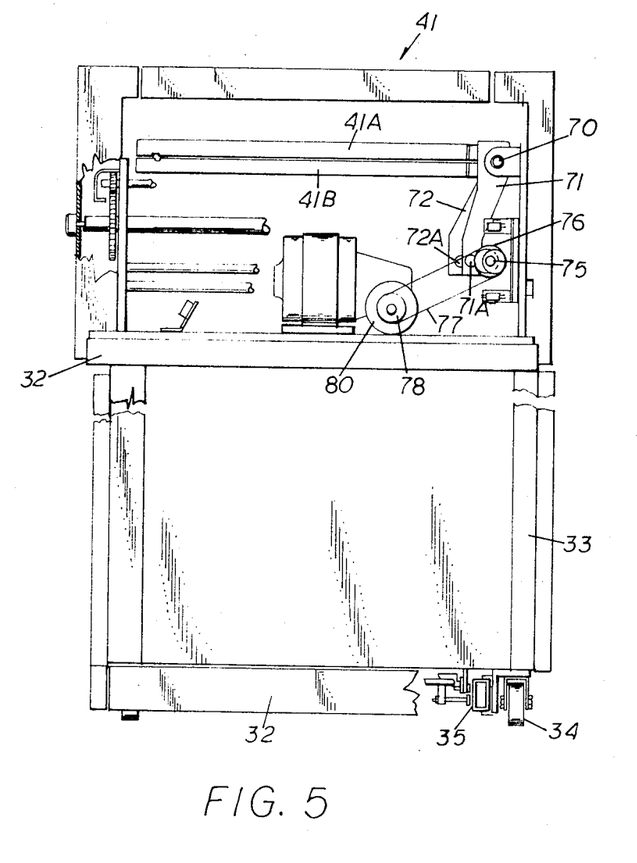
FIG. 5 is a front end view of the apparatus of FIG. 3.
Figure 7:
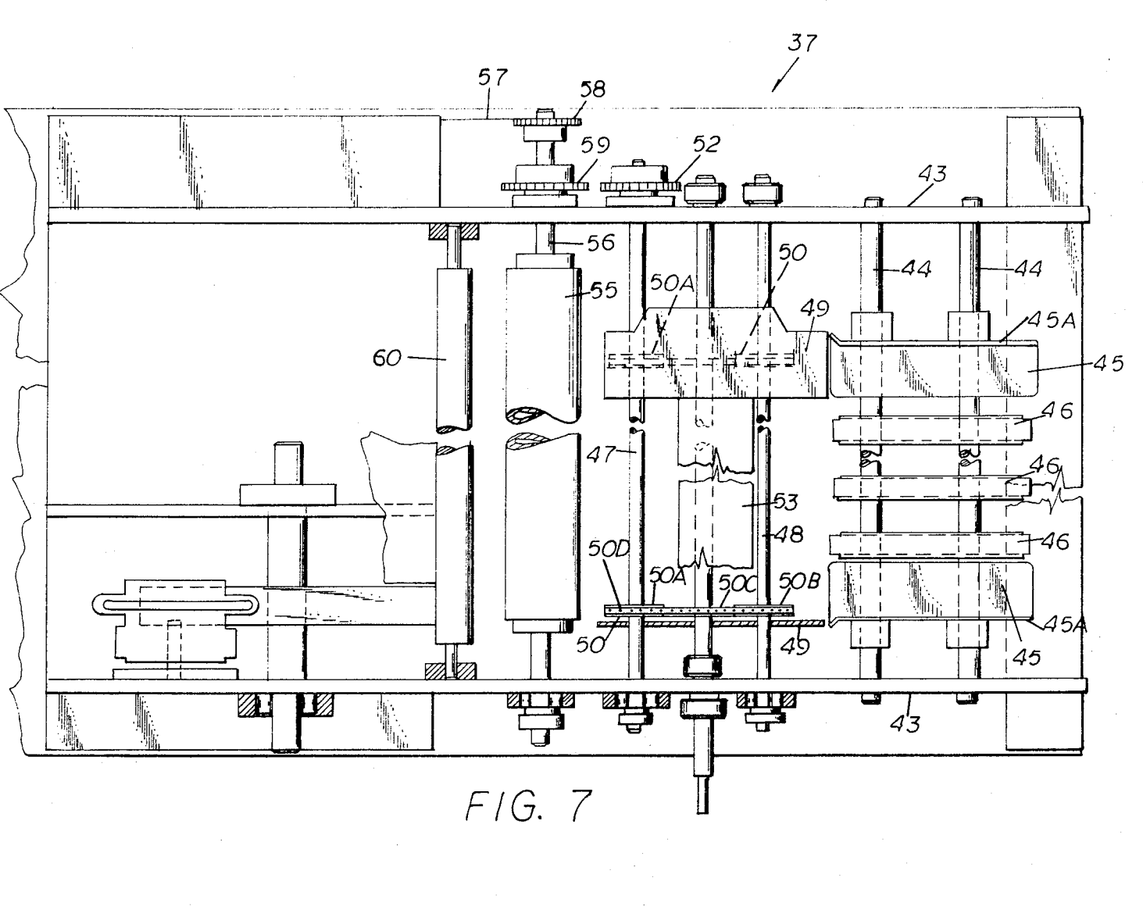
FIG. 7 is a plan view of the input section of FIG. 6.

Connected between opposed pairs of stanchions is a curvilinear guide plate 38 over which the web is guided. Cooperatively associated with the guide plate is a web hold down 39. Associated with each material guide 38 is a sensing switch, e.g. a micro switch 40 to sense the web as it is being directed to the input section 37 of the machine. The sensing switch 40, as will be hereinafter described, is operatively connected in circuit with the heater section 41 of the apparatus. The arrangement is such that whenever the switch 40 senses a break or interruption in the feed of the web to the input section, the heaters will pivot to an inoperative position until such time that a continuous feed is reestablished. The input section 37 is defined by an upward inclined opening 42 at one end of the machine. Extending transversely between the opposed side walls 43 of the input section 37 are a pair of spaced support rods 44—44 on which paper edge guides 45—45 are adjustably mounted. As best seen in FIGS. 4 and 7 the opposed edge guides 45 comprise an angled plate member having side flanges 45A to define a guide way for the web material 20, 21 entering the input section of the machine. The respective edge guides 45 can be laterally adjusted along the support rods 44 to accommodate any width of the web material within a predetermined range which is limited by the overall width of the input section 37. Disposed between the edge guides 45 and also supported on rods 44 are a plurality of support guides 44 for supporting the intermediate portion of the web material being fed between edge guides 45—45.

Spaced downstream of the edge guide support rods 44 are a pair of transversely extending shafts 47 and 48 which are suitably journalled in the end walls 43 of the input housing. Mounted on the respective shafts 47, 48 is a housing or covering 49 for an input feed means 50 which functions to initially collate the respective sheets 20, 21 of web material in contiguous superimposed relationship with respect to one another and to advance or feed the collated sheets toward the main drive means 50 of the machine to be picked up thereby.

In the illustrated form of the invention the input feed means 49 comprises opposed tractor feeds, each including a driving pulley 50A journalled to shaft 47 and a complementary driving pulley 50B mounted on shaft 48. Threaded about pulley 50A and 50B is an endless flexible drive, which may be in the form of a metal band 50C or the like that has spaced on the outer surface thereof a plurality of projections 50D which are spaced to be received in the marginal perforations or apertures 24 and 26 of the respective compatible sheets 20, 21. It will be understood that one of the shafts, as for example shaft 47, constitutes the drive shaft for effecting the drive of the input feed means 50. As best seen in FIGS. 4 and 7 sprocket 52 is connected to the end of shaft 47 which is suitably connected by a flexible drive to a suitable drive means.

Interposed between the housings 49 of the input feeds 50 on the incline of the input section 37 there is located a splicing table 53 to facilitate the joining of adjacent edges of successive sheets of web material to form the continuous flow of web material 20, 21 to the machine.

As best seen in FIG. 7 it will be noted that the housings 49 of the infeed means 50 together with the infeed pulleys 50A, 50B and endless band 50C threaded thereon are arranged so as to be laterally adjusted transversely of their respective shafts 47 and 48 for accommodating web material of varying widths. The arrangement is such that the infeed track or bands 50C are disposed in alignment with the edge guides 45, 45 directing the web material thereto so that the marginal perforation 24, 26 of the collated web material 20, 21 will receive the projections 50D of the infeed track. Thus as the infeed drive means 50 is actuated, the input track or band 50C functions to advance the web material in a continuous manner to the main drive means 51.

To maintain the marginal perforated portions of the collated web materials 20, 21 onto the projections 50D of the infeed tractor 50C, a hold down means in the form of a pressure foot 54 is provided. The pressure foot 54 is spring biased to insure positive retention of the web material on the projections 50D of the infeed tractor 50C.

As the material is advanced over the drive pulley 50A of the infeed means 50, the web is guided over a transversely extending guide roller 55 connected to shaft 56 journalled in the end walls of the machine. The guide rollers 55 may be connected in driving relationship to the drive means of the machine by a flexible drive 57 threaded over a drive sprocket 58 connected to the shaft 56 of the roller guide 55. Referring to FIG. 7, the drive of the feed means 50 may be taken from sprocket 59 on shaft 56 by a drive threaded over sprockets 59 and 52.

Disposed downstreamwise from the roller guide 50 is a tension roller 60 suitably mounted to maintain the web material 20, 21 under proper tension as it is being guided onto the main drive means 51 by which the collated sheets of web material are advanced to a heater section 41 of the apparatus.

Figure 6:
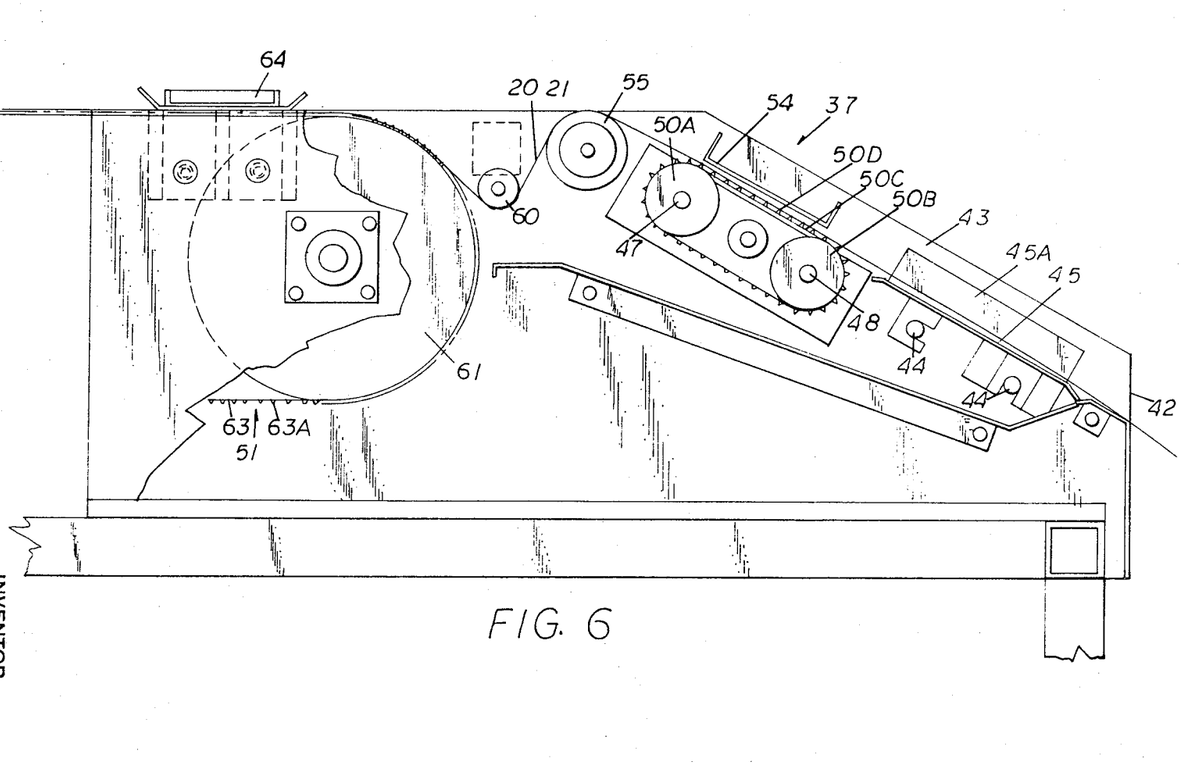
FIG. 6 is an enlarged detail sectional view of the input section of the apparatus of FIG. 3.

As best seen in FIG. 3 the main drive means 51 of the apparatus comprises a pair of end pulleys 61, 62 which are suitably journalled on end shafts 61A and 62A. Threaded about the respective end pulleys 61, 62 is an endless band 63 on which projections 63A are spaced similar to track 50. As seen in FIGS. 3 and 6 the drive of the web material is transferred from the infeed means 50 to the main drive 51 as it rounds the tension roller 60. In doing so the projections 63A of the main drive pick up perforations of the web material as the material leaves the input feed 50 to advance the material through the machine.

Operatively associated with the main feed means 51 is pressure foot 64 spaced to insure the maintenance of the web material on the projection 63A of the main drive track 63. In the illustrated form of the invention the main drive track 63 is located adjacent one side of the machine only.

The drive of the main drive track 63 is effected by a sprocket 65 connected to the drive shaft 62A of pulley 62 which in turn is suitably connected in driving relationship to a motor means 66 of the apparatus through a suitable drive connection.

Interposed between the input section 37 and the output section 67 between the end rollers 61 and 62 of the main drive 51 is the heater section 41. The heater section 41 comprises an upper heater platen 41A and a lower heater platen 41B which are suitably connected about a hinge bar 70 for movement between an operative overlying position as indicated in the solid line showing of FIG. 10 to an inoperative or open position as indicated in the phantom line showing of FIG. 10. It will be understood that the respective heater platens 41A, 41B include a suitable heating element, as for example, a calrod type electrical heater, or the like. Each heater section 41A, 41B has connected thereto a depending lever arm portion 71 and 72 respectively. Connected to the lower end of each arm 71, 72 is an associated roller cam follower 71A, 72A. Each cam follower 71A, 72A is disposed in rolling engagement with an associated eccentric 73, 74 suitably journalled on operating shaft 75 extending along the side wall of the housing of the apparatus.

Figure 8:
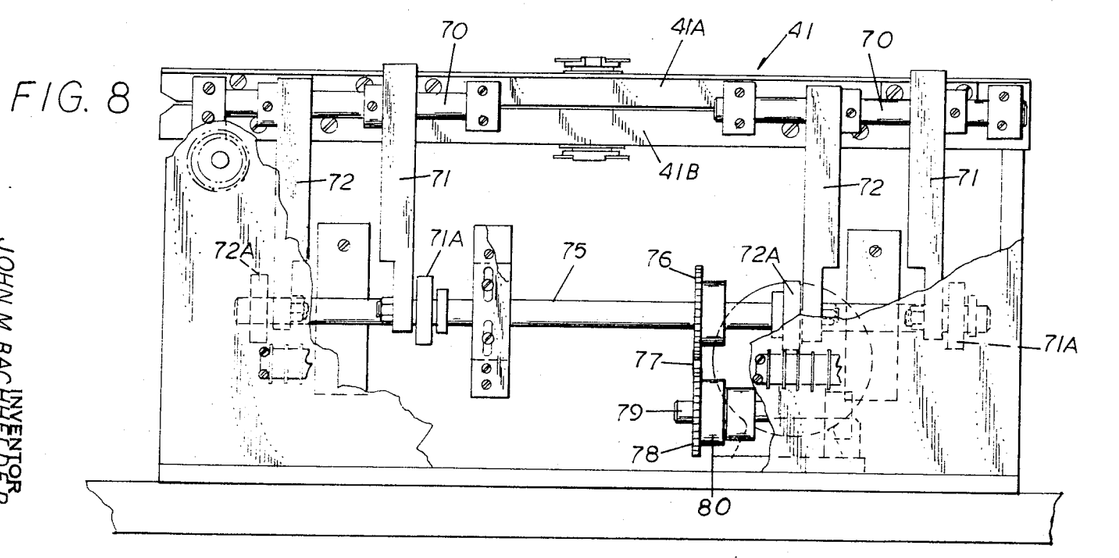
FIG. 8 is a detailed side elevation view of the heater section of FIG. 3.
Figure 9:
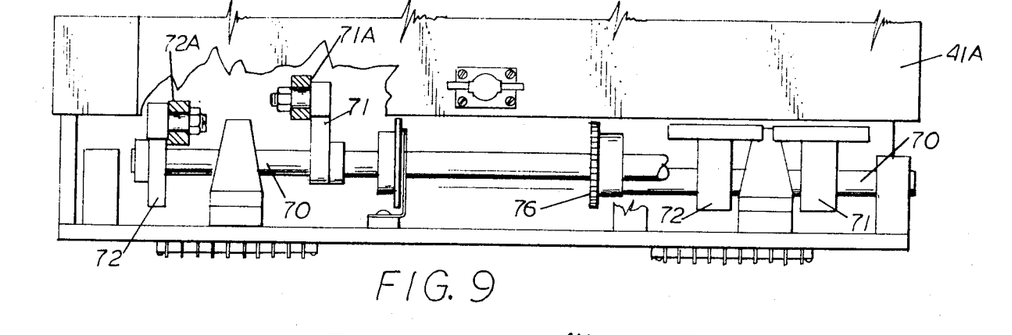
FIG. 9 is a fragmentary plan view of the heater section of FIG. 8.
Figure 10:
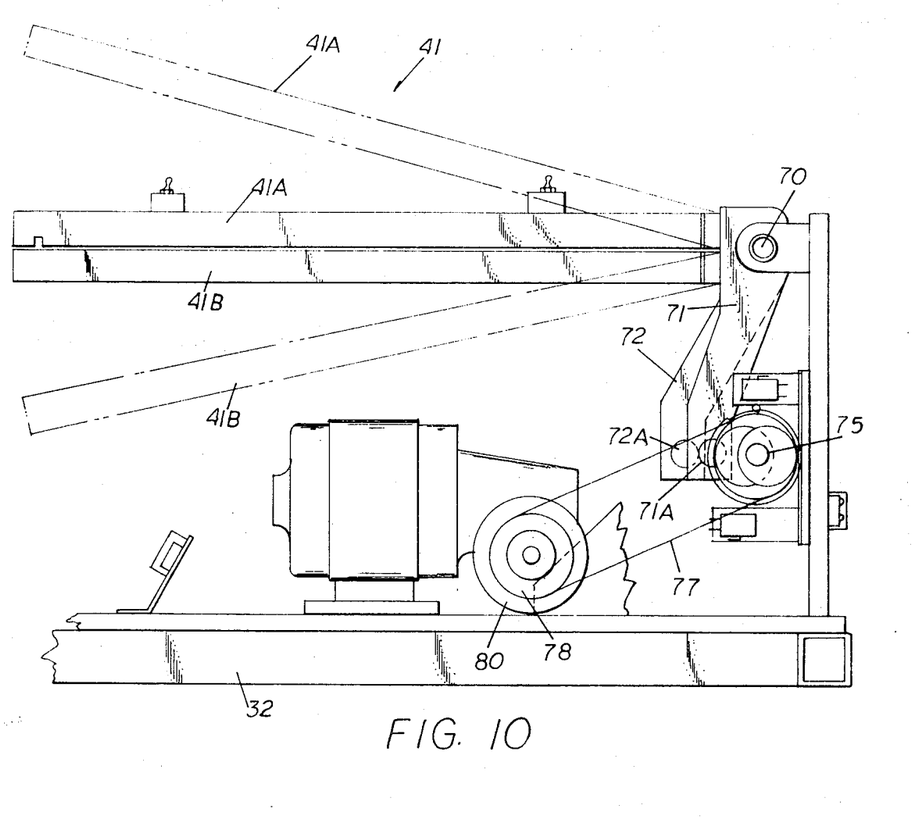
FIG. 10 is a detailed side elevation view of the heater section wherein the heater is shown in the operative position in the solid line showing thereof and in the inoperative position in the dotted line showing thereof.

As best seen in FIGS. 8 and 10 a sprocket or pulley 76 is connected to the eccentric drive shaft 75 which is in turn connected by a flexible drive 76 to a pulley 78 connected to the output shaft 79 of an operating motor 80. The arrangement is such that whenever the drive motor 80 is actuated, the eccentric drive shaft 75 is rotated together with the eccentrics 73, 74 therein. As the eccentrics rotate the cam followers 71A and 72A acting thereon cause the lever arms 71 and 72 to pivot resulting in the associated heater platens 41A, 41B to pivot about hinge 70. Referring to FIG. 10 the eccentrics 73, 74 operating on the followers 71A, 72A of the respective lever arms 71, 72 are disposed in out of phase relationship so that whenever the drive motor 80 is actuated the resulting action is that the movement of the respecive levers will cause the heater platens to move to an open or inoperative position.

The actuation of the motor drive means 80 for operating the eccentrics 73, 74 is wired in circuit with the sensing switch 40 located on the paper feed assembly 36 over which the web material is guided in advancing to the input section 37 of the machine. The arrangement is such that when the sensor switch 40 detects a break or interruption in the feed of web material to the input of the machine, the switch is actuated to complete the circuit to energize the motor drive means which in turn results in the pivoting of the respective heater platens 41A, 41B to the open position as indicated in the phantom line showing of FIG. 10. The heater sections 41A, 41B are pivoted to open position to prohibit overheating of the web material passing through the heater section of the apparatus when the machine is stopped for any reason, as for example, a break in the web, or when joining adjacent ends of successive webs. In the circuit between the sensing switch 40 and motor means 80 there is provided a delay means for effecting the operation of the motor 80 so as to permit the feed of the web material to continue until such time as the severed end of the web material reaches splicing table 53. Thus when a severed end or end portion of a sheet of web material reaches the splicing table 53 of the input section 37 of the machine, the motor 80 operating the eccentrics 73, 74 is actuated, causing the respective heater platens 41A, 41B to pivot to the open position as indicated in FIG. 10. Upon the splicing of the adjacent severed ends or the adjacent ends of successive webs the sensing means is again rendered operative to activate the motor to return the platens to their operative closed position for continued operation of the machine.

As the material or web advances beyond the heater section 41 the material is directed to the output section 67 which includes a pair of pressure applicating rollers 82 and 83. As best seen in FIG. 3 the respective pressure applicating rollers 82, 83 are suitably journalled about shafts 82A and 83A. The upper roller is preferably circumscribed with a friction producing surface, as for example, rubber or Teflon, and the bottom roller is formed with a metallic surface. The arrangement is such that the respective rollers 82, 83 are driven through a flexible drive 84 suitably connected to driving sprocket 85 joined on the main drive shaft 62A of the apparatus. The rollers 82, 83 are driven with a slight overspeed which is governed by an electric clutch. The arrangement is such that by effecting a slight overdrive to the pressure rollers 82, 83, they assist in effecting the feed of the material passing therebetween. The web in passing between the rollers 82 and 83 is thus subjected to bonding pressure sufficient to bond the webs together in accordance to the adhesive pattern printed thereon. To effect a rapid cooling of the bonded sheets of web material and thereby enhance the speed and handling of the continuous web, a cooling means 88 is interposed downstream of the pressure applicating rollers 82, 83. As best seen in FIG. 3, the cooling means comprises a cooling duct 89 through which cooling air, generated by a fan or blower 90, is permitted to flow. Consequently as best seen in FIG. 3 the laminated web material in passing the pressure applicating rollers 82, 83 is caused to feed over duct 89 in heat transfer relationship thereto whereupon the residual heat of the web material is dissipated.

If desired, a secondary pair of pressure applicating rollers 92, 93 are provided to effect a final or secondary laminating pressure to the bonded webs. Pressure rollers 92, 93 are similar in construction to pressure rollers 82, 83. The drive of the secondary rollers 92, 93 may be taken directly off the drive of roller 83 by a connected drive.

Upon the passage of the bonded sheets through the secondary presure rollers 92, 93 the bonded sheet may be directed to a suitable collector and/or cutting or separating unit whereby the individual informational units can be readily separated along the perforation pattern for immediate mailing. The separated units can then be readily counted, and/or sorted and mailed as may be required by the needs of the user.

The apparatus described attains speeds of up to 28,000 to 32,000 per hour. According to the invention herein described, the documents after being preprinted are arranged so that they can be automatically collated and bonded at a considerably rapid rate of speed by maintaining documents as a continuous web until the final step just before distribution.

It will be understood that pressure sensitive adhesive as used herein is defined as any adhesive that may be reactivated by the application of either heat and/or pressure.

While the instant invention has been described with respect to a particular embodiment thereof it will be readily understood and appreciated that variations and modifications may be made without departing from the spirit or scope of thei nvention.

What is claimed is:

1. A machine for collating and bonding two or more continuous sheets of web material wherein at least one of said continuous sheets of web material has coated on at least one side thereof a predetermined pattern of pressure sensitive adhesive comprising:
    a frame,
    an input section and output section mounted on said frame in spaced relation,
    a heating section interposed between said input and output section,
    said input section including means for collating said sheets of web material in contiguous superimposed relationship,
    means for simultaneously advancing said superimposed collated sheets of web material through said heater section in moving from said input section to said output section,
    said output section including pressure applying means for imparting
    a bonding pressure on said sheets of web material said pressure applying means comprising a first pair of pressure rollers, and means for effecting the drive of said first pair of pressure rollers relative to the movement of said web material passing therebetween whereby said rolling action imparts a bonding pressure on said sheet material, wherein said drive means for said pressure rollers imparts an overspread thereto whereby said pressure rollers assist the material advancing drive means in advancing said material through said machine, and means for cooling said bonded sheets of web material.

2. The invention as defined in claim 1 and including a second pair of pressure rollers, said second pair of pressure rollers being spaced downstreamwise from said first pair of pressure rollers.

3. The invention as defined in claim 1 wherein said heater section includes:
    an upper heating platen and a lower heating platen,
    means for hingedly connecting said platens for relative movement whereby said platens pivot between an operative position and inoperative position,
    means operatively connected to the respective platens for effecting the pivoting thereof to inoperative position when the machine is stopped.

4. The invention as defined in claim 1 and including a standard for directing each of said web sheets of material to said input section, said standard being slideably adjusted on said frame.

5. The invention as defined in claim 4 and including a web sensing switch operatively associated with said standard adapted to be activated by the sheet of web material directed toward said input section.

6. The invention as defined in claim 1 wherein said input section includes:
    a pair of oppositely disposed edge guides which are laterally adjustable for accommodating the width of said web material,
    support means interposed between said guides for supporting said web material between said guides,
    and said collating means including an in-feed means, said in-feed means comprising an endless drive,
    and means on said endless drive for conveying said sheets to said material driving means.

7. The invention as defined in claim 6 and including means for permitting lateral adjustment of said in-feed means.

8. The invention as defined in claim 7 and including said input section including a pair of opposed edge guides, oppositely disposed input feed means,
    said input feed means including an endless band having spaced projections thereon adapted to engage the marginal perforations of said sheets to advance said sheets between said heaters,
    presure foot means operatively associated with each of said input feed means to maintain said marginal perforations on said projections.

9. The invention as defined in claim 1 and including means for varying the distance between said opposed input feed means to accommodate sheets of varying widths.

10. The invention as defined in claim 7 wherein said cooling means comprises a chamber over which said bonded sheets pass, and a fan means for directing cooling air through said chamber.

11. The invention as defined in claim 1 and including a second pair of bonding rollers spaced downstreamwise from said first mentioned pair of bonding rollers for applying a final bonding pressure on said bonded sheets.

12. The invention as defined in claim 3 and including operating means for effecting the operation of said heater sections,
    said operating means including a pivoting lever connected to each of said heater platens,
    an eccentric operating on each of said levers,
    and means for effecting the drive of said eccentric to effect displacement of said pivoting levers accordingly.

13. A machine for collating and bonding two or more continuous sheets of web material having perforated marginal portions and at least one of said sheets having coated on at least one side thereof a predetermined pattern of pressure sensitive adhesive comprising:
    a frame,
    an input section and an output section mounted on said frame,
    a heater means interposed between said input and output section,
    said heater means including a top heater and a bottom heater;
    hinge means pivotally connecting said top and bottoms heaters for movement between operative and inoperative positions,
    operating means for effecting the movement of said heater means to an operative and inoperative position, a standard for directing each of said sheets to said input section,
said standard being slideably adjusted on said frame,
a sensing switch operatively associated with said standard for sensing said sheet material being directed to said input section,
said sensing switch being connected in circuit with said operating means whereby said heaters are moved to inoperative position when said sensing switch fails to sense said sheet,
said input section including a pair of opposed edge guides,
means for permitting lateral adjustment of said guides for accommodating sheet material of varying widths therebetween,
a support means interposed between said guide means for supporting the sheets therebetween,
oppositely disposed input feed means,
said input feed means including an endless band having spaced projections thereon adapted to engage the marginal perforations of said sheets to advance said sheets between said heaters,
pressure foot means operatively associated with each of said input feed means to maintain said marginal perforations on said projections,
means for varying the distance between said opposed input feed means to accommodate sheets of varying widths,
a main drive means for advancing said collated sheets from said input section and through said heater section to said output section,
said drive means including end pulleys,
a flexible endless drive threaded over said end pulleys,
said endless drive having spaced projections thereon adapted to engage the marginal perforations of said collated sheets advancing from said input section,
a pair of complementary pressure rollers disposed immediately downstream from said heater section for applying a bonding pressure on said collated sheets advancing therebetween,
means for imparting an overspeed to said rollers whereby said pressure rollers assist the main drive means,
means for cooling the bonded sheets passing between said bonding rollers,
and a second pair of bonding rollers spaced downstreamwise from said first mentioned pair of bonding rollers for applying a final bonding pressure on said bonded sheets.

References Cited

UNITED STATES PATENTS

| | | | |
|---|---|---|---|
| 3,652,007 | 3/1972 | MacDougall et al. | 229—69 |
| 3,482,780 | 12/1969 | Johnsen | 229—69 |
| 3,355,090 | 11/1967 | Werby | 229—69 |
| 3,565,728 | 2/1971 | Alton | 229—69 |
| 2,919,044 | 12/1959 | Northrup | 156—350 |
| 3,337,120 | 7/1967 | Steidinger | 229—69 |
| 3,437,259 | 4/1969 | Steidinger | 229—69 |
| 3,339,827 | 9/1967 | Steidinger | 229—69 |
| 3,554,438 | 1/1971 | Malderghem | 229—69 |
| 3,552,282 | 1/1971 | Wilson | 229—69 |

J. TRAVIS BROWN, Primary Examiner

E. C. KIMLIN, Assistant Examiner

U.S. Cl. X.R.

156—349